US006632329B1

(12) United States Patent
Mizutani et al.

(10) Patent No.: US 6,632,329 B1
(45) Date of Patent: Oct. 14, 2003

(54) DISTILLATION APPARATUS AND DISTILLING METHOD

(75) Inventors: Noriaki Mizutani, Himeji (JP); Yukihiro Matsumoto, Kobe (JP); Kazuhiko Sakamoto, Himeji (JP); Kenji Sanada, Himeji (JP)

(73) Assignee: Nippon Shokubai Co., Ltd., Osaka-fu (JP)

( * ) Notice: Subject to any disclaimer, the term of this patent is extended or adjusted under 35 U.S.C. 154(b) by 0 days.

(21) Appl. No.: 09/695,882

(22) Filed: Oct. 26, 2000

(30) Foreign Application Priority Data

Oct. 29, 1999 (JP) .......................................... 11-308010

(51) Int. Cl.⁷ .............................. B01D 3/04; B01D 3/14; B01D 3/32; B01D 3/42; C07C 51/44
(52) U.S. Cl. ........................... 203/1; 159/901; 202/181; 203/98; 203/DIG. 21; 203/100; 203/8; 562/600
(58) Field of Search ........................ 203/8, 1, DIG. 21, 203/100, 98; 202/164, 181; 196/130, 137; 562/600; 159/901

(56) References Cited

U.S. PATENT DOCUMENTS

| 40,632 | A | * | 11/1863 | Lockhart et al. ............ 196/130 |
| 1,843,742 | A | * | 2/1932 | Seguy ........................ 196/130 |
| 3,177,129 | A | | 4/1965 | Huckins, Jr. et al. |
| 5,019,219 | A | * | 5/1991 | Hamer et al. ................ 202/205 |
| 5,034,102 | A | | 7/1991 | Rüdel |
| 5,047,124 | A | * | 9/1991 | Haberland .................. 202/181 |
| 5,849,161 | A | * | 12/1998 | Kishimoto et al. ............ 203/96 |
| 6,372,944 | B1 | * | 4/2002 | Matsumoto et al. ........ 562/600 |

FOREIGN PATENT DOCUMENTS

| EP | 0 382 315 | 8/1990 |
| EP | 0 854 124 | 7/1998 |
| JP | 60-61002 | 4/1985 |

OTHER PUBLICATIONS

Kister's publication, "Distillation Operation" (McGraw Hill) pp. 95 & 123.*

Henry Z. Kister, McGraw-Hill, "Distillation Operation", 1990, pp. 98–101.

* cited by examiner

Primary Examiner—Virginia Manoharan
(74) Attorney, Agent, or Firm—Wenderoth, Lind & Ponack L.L.P.

(57) ABSTRACT

A distillation apparatus is provided with a distillation tower, a reboiler, a bottom outflow pipe for drawing a liquid from the bottom of the distillation tower, and a pot provided between the bottom of the distillation tower and the bottom outflow pipe. A part of the drawn liquid is discharged to the outside of the distillation apparatus while the rest is flowed to the reboiler. The pot has a cross-sectional area smaller than a cross-sectional area of the distillation tower and larger than a cross-sectional area of the bottom outflow pipe.

17 Claims, 3 Drawing Sheets

DISTILLATION APPARATUS AND DISTILLING METHOD

BACKGROUND OF THE INVENTION

This invention relates to distillation apparatus and distilling method. More particularly, the invention pertains to apparatus and method suited for distilling an easily polymerizable compound, such as a (meth)acrylic acid.

Distillation of a polymerizable compound, such as a (meth)acrylic acid, tends to produce a polymer which could cause clogging of a pipe. Conventionally, a polymerization inhibitor or molecular oxygen has been added to the compound to prevent such polymerization.

In a lower portion of a distillation tower, however, the temperature is generally high, so that the polymerization is likely to occur if the retention time of a liquid in the lower portion of the distillation tower is prolonged. When a polymer has been produced, operation of the distillation tower is stopped and the polymer is removed by chemical treatment or manual operation.

One potential approach to preventing the polymerization would be to shorten the retention time of the liquid. This approach, however, has a problem that vortex could occur in the liquid when its level in the distillation tower becomes low, making it difficult to carry out a distilling process in a stable fashion due to entrainment of gas caused by the vortex.

Another approach to the prevention of polymerization is introduced in "Distillation Operation" (McGraw-Hill) written by Kister. Kister indicates, in the drawing (FIG. 4.8(a)) on page 99 of the book, a method of maintaining the liquid level on the inside of a pot. This method, however, is likely to cause polymerization at a lower head of a distillation tower. Furthermore, the pot needs to have a large vertical length in this method, causing an increase in construction cost.

SUMMARY OF THE INVENTION

It is an object of the invention to provide a distillation apparatus and distilling method which are free from the problem residing in the prior art.

According to an aspect of the invention, a distillation apparatus comprises: a distillation tower; a bottom outflow portion for allowing a liquid from the bottom of the distillation tower to flow out of the distillation tower; and a pot portion provided between the bottom of the distillation tower and the bottom outflow portion, the pot portion having a cross-sectional area smaller than the cross-sectional area of the distillation tower, and larger than the cross-sectional area of the bottom outflow portion.

According to another aspect of the invention, an easily polymerizable compound is distilled by use of a distillation apparatus which comprises a distillation tower; a bottom outflow portion for allowing a liquid from the bottom of the distillation tower to flow out of the distillation tower; and a pot portion provided between the bottom of the distillation tower and the bottom outflow portion, the pot portion having a cross-sectional area smaller than the cross-sectional area of the distillation tower, and larger than the cross-sectional area of the bottom outflow portion.

The distillation apparatus and distilling method make it possible to effectively prevent polymerization in a distillation tower without causing entrainment of gas into a liquid and perform distilling operation in a stable fashion.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Inventors of this invention have found that the aforementioned problems could be solved by providing a pot of a specific size at the bottom of a distillation tower, and completed this invention based on this knowledge.

An inventive distillation apparatus comprises a distillation tower; a bottom outflow portion for allowing a liquid from the bottom of the distillation tower to flow out of the distillation tower; and a pot portion provided between the bottom of the distillation tower and the bottom outflow portion, the pot portion having a cross-sectional area smaller than the cross-sectional area of the distillation tower, and larger than the cross-sectional area of the bottom outflow portion.

Specifically, the inventive distillation apparatus comprises a distillation tower, a reboiler, a bottom outflow pipe for drawing a liquid from the bottom of the distillation tower, and a pot provided between the bottom of the distillation tower and the bottom outflow pipe. A portion of the liquid is discharged through the bottom outflow pipe to the outside of the distillation apparatus while the rest is flowed to the reboiler. The pot satisfies the following conditions (a) and (b):

(a) $S1/S2$=from 0.02 to 0.5, i.e. $0.02 \leq S1/S2 \leq 0.50$ (b) $S1/S3$=from more than 1 to 20, i.e. $1 < S1/S3 \leq 20$ where $S1$ is the cross-sectional area of the pot, $S2$ is the cross sectional area of the distillation tower, and $S3$ is the cross-sectional area of the bottom outflow pipe.

Another inventive distillation apparatus comprises a distillation tower, a reboiler, a recirculating pipe for sending a portion of a liquid to the reboiler, a discharge pipe for discharging the rest of the liquid to the outside of the distillation apparatus, and a pot provided between the bottom of the distillation tower and the discharge pipe and the recirculating pipe. The pot satisfies the following conditions, (a) and (c):

(a) $S1/S2$=from 0.02 to 0.5, i.e. $0.02 \leq S1/S2 \leq 0.50$ (c) $S1/S4$, $S1/S5$=from more than 1 to 20, i.e. $1 < S1/S4 \leq 20$ and $1 < S1/S5 \leq 20$ where S1 is the cross-sectional area of the pot, S2 is the cross-sectional area of the distillation tower, S4 is the cross-sectional area of the discharge pipe, and S5 is the cross-sectional area of the recirculating pipe.

Still another inventive distillation apparatus comprises a distillation tower, a reboiler, a recirculating pipe for sending a portion of a liquid to the reboiler, a discharge pipe for discharging the rest of the liquid to the outside of the distillation apparatus, a first pot provided between the bottom of the distillation tower and the discharge pipe, and a second pot provided between the bottom of the distillation tower and the recirculating pipe. The first and second pots satisfy the following conditions (a) and (d):

(a) [S1(A)+S1(B)]/S2=from 0.02 to 0.5, i.e. 0.02≦[S1(A)+S1(B)]/S2≦0.50

(d) S1(A)/S4, S1(B)/S5=from more than 1 to 20, i.e. 1<S1(A)/S4≦20 and 1<S1(B)/S5≦20 where S1(A) is the cross-sectional area of the first pot to which the discharge pipe is connected, S1(B) is the cross-sectional area of the second pot to which the recirculating pipe is connected, S2 is the cross-sectional area of the distillation tower, S4 is the cross-sectional area of the discharge pipe, and S5 is the cross-sectional area of the recirculating pipe.

An inventive distilling method for distilling an easily polymerizable compound uses one of the aforementioned distillation apparatus. The level of the liquid within the distillation tower may be preferably maintained between upper and lower ends of a head surface provided at the bottom of the distillation tower. Further, the liquid in the pot may be preferably made to flow at a linear velocity of 0.03 to 1 m/s.

These inventive distillation apparatus can effectively prevent polymerization when used for distilling an easily polymerizable compound, such as a (meth)acrylic acid.

Entrainment of gas into the liquid due to the occurrence of vortex in a distillation tower bottom can also be prevented effectively. Accordingly, it is possible to carry out a distilling process in a stable fashion. Thus, these inventive distillation apparatus and distilling method will confer important advantages in industrial applications.

The inventive distillation apparatus are particularly suited for distilling easily polymerizable compounds. Typical examples of the polymerizable compounds are (meth)acrylic acids and their esters, such as methyl ester, ethyl ester, isopropyl ester, n-propyl ester, isobutyl ester, n-butyl ester and 2-hydroxyethyl ester, hydroxypropyl ester, N,N-dimethylaminoethyl ester. In the context of the present specification of the invention, "distillation of an easily polymerizable compound" refers to an operation for distilling any one or a mixture of these compounds, or a liquid containing any of these compounds.

Figure 1:
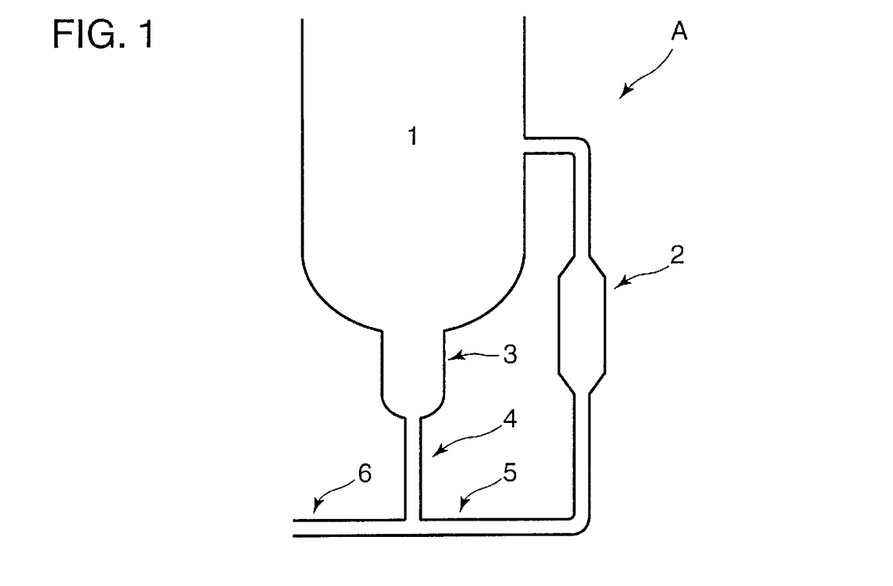
FIG. 1 is a cross-sectional explanatory diagram showing principal parts of a distillation apparatus according to a first embodiment of the invention.

Referring to FIG. 1, a distillation apparatus A according to a first embodiment of the invention comprises a distillation tower 1, a reboiler 2 and a bottom outflow pipe 4 for drawing liquid from the bottom of the distillation tower 1. Part of the bottom liquid, which is drawn from the bottom of the distillation tower 1 through the bottom outflow pipe 4, is flowed to the reboiler 2 through a recirculating pipe 5 for recycling while the rest is discharged to the outside of the distillation apparatus A through a discharge pipe 6. There is provided a pot 3 which satisfies the following conditions (a) and (b) between the bottom of the distillation tower 1 and the bottom outflow pipe 4:

(a) S1/S2=from 0.02 to 0.5 (preferably 0.05 to 0.4)

(b) S1/S3=from more than 1 to 20 (preferably 1.5 to 16, and more preferably 2 to 12)

where S1 is the cross-sectional area of the pot 3, S2 is the cross-sectional area of the distillation tower 1 and S3 is the cross-sectional area of the bottom outflow pipe 4.

If S1/S2 is smaller than 0.02, gas might be entrained in the liquid depending on the level of the liquid. If S1/S2 exceeds 0.5, on the contrary, polymerization is likely to occur due to an increase in retention time of the liquid.

On the other hand, if S1/S3 exceeds 20, the retention time becomes longer or channeling occurs in the pot 3, consequently likely causing polymerization to occur in the pot 3. If S1/S3 is 1 or smaller, it is impossible to form the pot 3. The cross-sectional area S3 of the bottom outflow pipe 4 is determined in consideration of the amount of the liquid flowed to the reboiler 2.

Figure 2:
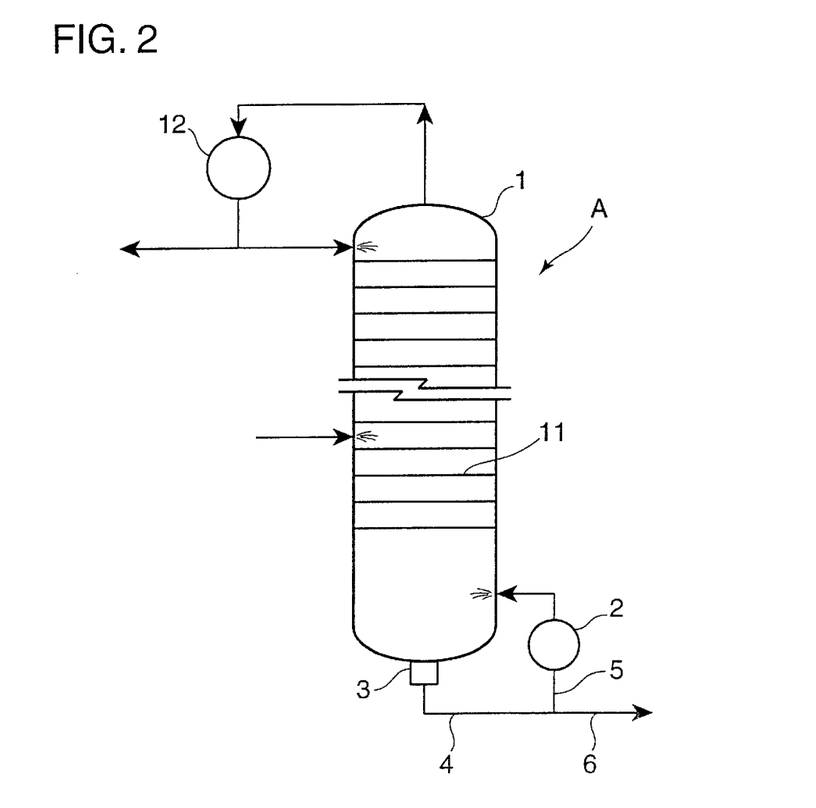
FIG. 2 is a cross-sectional explanatory diagram showing an overall construction of the distillation apparatus of FIG. 1.

The overall construction of the distillation apparatus A is as shown in FIG. 2. The distillation tower 1 includes a cylindrical vessel having head surfaces at the top and bottom and accommodating a gas-liquid contact device, such as multistage trays 11, on the inside. The distillation apparatus A further comprises a condenser 12.

A raw liquid material is introduced into the distillation tower 1 through its wall. A component of the raw liquid material having a low boiling point vaporizes when heated in the distillation tower 1, rises within the distillation tower 1 and is delivered to the condenser 12 from the top of the distillation tower 1. The component is condensed in the condenser 12 and drawn to the outside of the distillation apparatus A. On the other hand, a component having a high boiling point is drawn through the pot 3 and the bottom outflow pipe 4 at the bottom of the distillation tower 1. A specific portion of this component is returned to the distillation tower 1 through the reboiler 2 while the rest is discharged to the outside through the discharge pipe 6.

Figure 3:
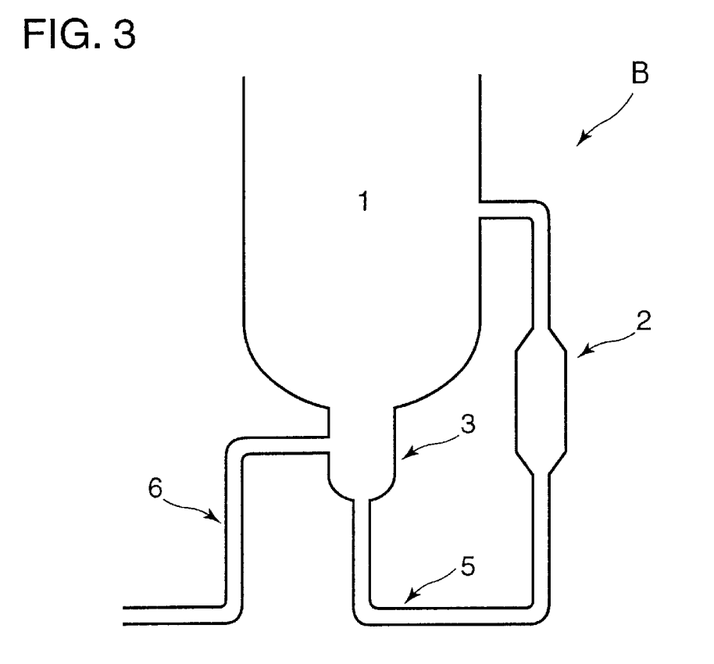
FIG. 3 is a cross-sectional explanatory diagram showing principal parts of a distillation apparatus according to a second embodiment of the invention.

A distillation apparatus B shown in FIG. 3 according to a second embodiment of the invention comprises a distillation tower 1, a reboiler 2, a pot 3, a recirculating pipe 5 for sending part of the bottom liquid to the reboiler 2, and a discharge pipe 6 for discharging the rest of the bottom liquid to the outside of the distillation apparatus B. The pot 3 is provided between the bottom of the distillation tower 1 and the recirculating pipe 5, and the discharge pipe 6 branches out from the side of the pot 3. The pot 3 satisfies the following conditions (a) and (c):

(a) S1/S2=from 0.02 to 0.5 (preferably 0.05 to 0.4)

(c) S1/S4, S1/S5=from more than 1 to 20 (preferably 1.5 to 16, and more preferably 2 to 12)

where S1 is the cross-sectional area of the pot 3, S2 is the cross-sectional area of the distillation tower 1, S4 is the cross-sectional area of the discharge pipe 6 and S5 is the cross-sectional area of the recirculating pipe 5.

If S1/S2 is smaller than 0.02, retention of the liquid is scarcely observed in a central part of the distillation tower 1, but a liquid retention zone enlarges and polymerization becomes likely to occur near the surface of a lower head of the distillation tower 1. If S1/S2 exceeds 0.5, on the contrary, the retention time becomes longer or channeling occurs in the pot 3, which consequently causes polymerization to likely occur in the pot 3.

If S1/S4 and S1/S5 each exceed 20, the retention time becomes longer or channeling occurs in the pot 3, consequently likely causing polymerization to occur in the pot 3. If S1/S4 and S1/S5 each is 1 or smaller (or S1 is smaller than S4 or S5), it is impossible to form the pot 3.

Figure 4:
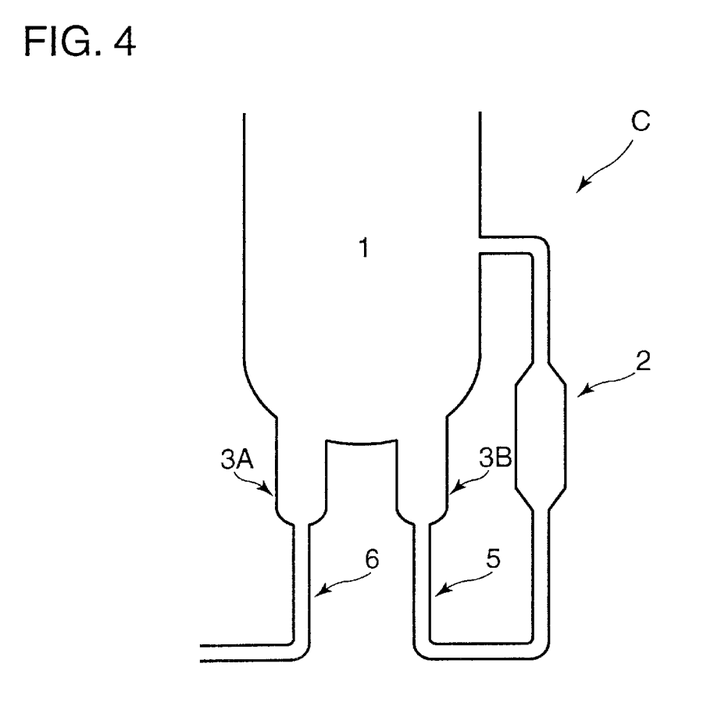
FIG. 4 is a cross-sectional explanatory diagram showing principal parts of a distillation apparatus according to a third embodiment of the invention.

A distillation apparatus C shown in FIG. 4 according to a third embodiment of the invention comprises a distillation tower 1, a reboiler 2, a recirculating pipe 5 for sending part of a bottom liquid, which is drawn from the bottom of the distillation tower 1, to the reboiler 2, and a discharge pipe 6 for discharging the rest of the bottom liquid to the outside of the distillation apparatus C. A pot 3A is provided between the bottom of the distillation tower 1 and the discharge pipe 6 while a pot 3B is provided between the bottom of the distillation tower 1 and the recirculating pipe 5 as illustrated. These pots 3A, 3B satisfy the following conditions (a) and (d):

(a) [S1(A)+S1(B)]/S2=from 0.02 to 0.5 (preferably 0.05 to 0.4)

(d) S1(A)/S4, S1(B)/S5=from more than 1 to 20 (preferably 1.5 to 16, and more preferably 2 to 12)

where S1(A) is the cross-sectional area of the pot 3A to which the discharge pipe 6 is connected, S1(B) is the cross-sectional area of the pot 3B to which the recirculating pipe 5 is connected, S2 is the cross-sectional area of the distillation tower 1, S4 is the cross-sectional area of the discharge pipe 6 and S5 is the cross-sectional area of the recirculating pipe 5.

If S1(A)+S1(B)/S2 is smaller than 0.02, retention of the liquid is scarcely observed above the pots 3A, 3B at the bottom of the distillation tower 1, but a liquid retention zone enlarges and polymerization becomes likely to occur away from the pots 3A, 3B. If S1(A)+S1(B)/S2 exceeds 0.5, on the contrary, the retention time becomes longer or channeling occurs in the pots 3A and 3B, consequently causing polymerization to likely occur in the pots 3A, 3B.

If S1(A)/S4 and S1(B)/S5 each exceed 20, the retention time becomes longer or channeling occurs in the pots 3A and 3B, consequently likely causing polymerization to occur in the pots 3A, 3B. If S1(A)/S4 and S1(B)/S5 each is 1 or smaller, it is impossible to form the pots 3A, 3B.

In the aforementioned distillation apparatus A, B, and C, the length of a shell of each pot should preferably be 200 to 1000 mm, and more preferably 300 to 800 mm. If the pots are too short, gas will be entrained in the liquid when vortex occurs, making it difficult to perform distilling operation in a stable fashion. If the pots are too long, on the contrary, retention time of the liquid will increase, making the polymerization to easily occur.

Figure 5:
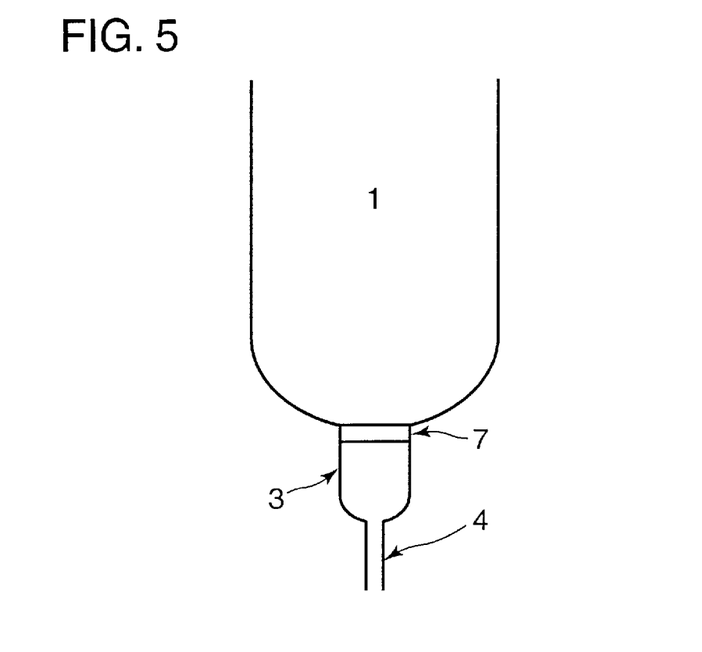
FIG. 5 is an explanatory diagram showing how a vortex breaker is fitted to a pot.

Furthermore, it is preferable in the distillation apparatus A, B, and C to provide each pot with a vortex breaker which is known in the prior art. The vortex breaker, if fitted to each pot of the distillation apparatus A, B, and C, serves to prevent entrainment of the gas caused by vortex and enable stable distilling operation. FIG. 5 is an explanatory diagram showing how a vortex breaker 7 is fitted to a pot.

Among the distillation apparatus A, B, and C of the foregoing embodiments, the distillation apparatus A is particularly suitable for achieving stable distillation operation. This is because the distillation apparatus A effectively prevents polymerization of the liquid in the distillation tower 1, enables stable distilling operation with reduced entrainment of the gas and provides ease of manufacture and construction.

A distilling method may be carried out by using any of the aforementioned distillation apparatus A, B, and C to effectively prevent polymerization by distilling a liquid while maintaining the liquid level between upper and lower ends of the head surface at the bottom of the distillation tower 1.

Figure 6:
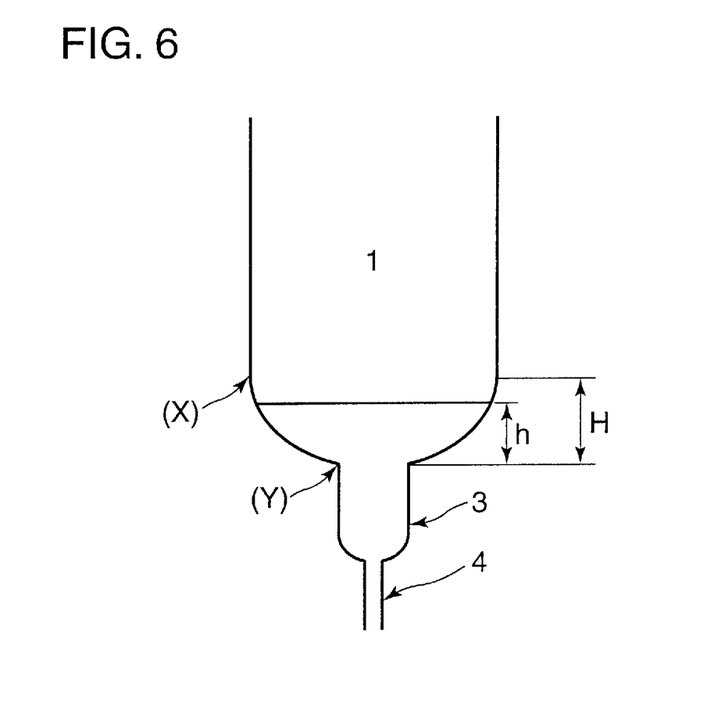
FIG. 6 is an explanatory diagram showing the liquid level in a distillation tower.

FIG. 6 is an explanatory diagram showing the liquid level in the distillation tower 1 just above the pot 3. In FIG. 6, indicated at X and Y are upper and lower ends of the head surface at the bottom of the distillation tower 1, respectively.

H indicates the distance between the upper and lower ends of the head surface measured along the vertical, and h indicates the level of the liquid. Distilling the liquid while maintaining its level between the upper and lower ends of the head surface at the bottom of the distillation tower 1 means that the liquid level h is maintained to satisfy $0 \leq h \leq H$ during the distilling operation. The liquid level h should preferably be $0.2H \leq h \leq 0.8H$, and more preferably $0.4H \leq h \leq 0.6H$. If the liquid level h becomes higher than the upper end X of the head surface at the bottom of the distillation tower 1, vortex is less likely to occur, but a larger liquid retention zone might develop, causing the polymerization. If the liquid level h is lower than the lower end Y of the head surface, on the contrary, no liquid retention zone develops near the head surface at the bottom of the distillation tower 1, so that the polymerization can be avoided. In this case, however, vortex is more likely to occur and the flow of the liquid will become unstable, so that it will not be possible to perform the distilling operation in a stable fashion.

In this distilling method, it may be preferable to make the retention time of the liquid at the bottom of the distillation tower 1 calculated by the following equation equal to or less than 120 minutes. More preferably, this retention time should be made equal to or less than 90 minutes, and yet more preferably, it should be made equal to or less than 60 minutes.

Retention time=(the amount of liquid held between the liquid level and an inflow of the bottom outflow pipe)/(the amount of liquid drawn to the outside of the tower per minute)

In this distilling method, it may be preferable that the liquid flow in the pot 3 (3A, 3B) at a linear velocity of 0.03 to 1 m/s. If the linear velocity is lower than 0.03 m/s, dirt is likely to adhere to the pot 3 (3A, 3B) and this will cause the polymerization to occur easily. On the contrary, if the linear velocity of the liquid exceeds 1 m/s, vortex is likely to occur and the flow of the liquid will become unstable, making it impossible to perform the distilling operation in a stable fashion.

According to the distillation apparatus A, B, and C of the foregoing embodiments, the pot 3 (3A, 3B) provided at the bottom of the distillation tower 1 shortens the retention time of the liquid by decreasing the amount of the liquid held in a lower portion of the distillation tower 1 and thereby prevents the polymerization at the bottom of the distillation tower 1 where the highest temperature exists. As a result, it is possible to perform the distilling operation in a stable fashion.

In a conventional distillation apparatus, polymerization of the liquid is accelerated when its retention time increases. This causes clogging of a pump strainer or of a recirculating line connected to a reboiler, making it impossible to operate the distillation apparatus. If the gas is entrained in the liquid near an outflow at the lower part of the distillation tower, the amount of the liquid circulated to the reboiler will decrease, causing a deterioration in its heat-transfer properties as well as cavitation in the pump. As a consequence, it will become impossible to send the liquid downstream.

Conventionally, there has been no alternative but to maintain the liquid level in a shell of the distillation tower above its lower head surface for preventing entrainment of the gas into the recirculating line connected to the reboiler. In the distillation apparatus A, B, and C, however, the pot 3 (3A, 3B) provided at the bottom of the distillation tower 1 serves to reduce the amount of the liquid retained at the lower portion of the distillation tower 1, solve the gas entrainment problem and prevent polymerization of the liquid, enabling stable distilling operation.

Distillation test results obtained by using the inventive distillation apparatus will be below described with comparatives examples.

EXAMPLE 1

An acrylic acid was distilled using the distillation apparatus A shown in FIG. 1.

The distillation apparatus having an inner diameter of 1200 mm was provided with a pot measuring 500 mm in inner diameter and 500 mm in height as well as a bottom outflow pipe measuring 300 mm in inner diameter. In this distillation apparatus, S1/S2=0.174 and S1/S3=2.778.

A liquid containing 85 weight percent of the acrylic acid and 14 weight percent of an acetic acid was fed into the distillation tower from around the middle of an assembly of vertically arranged thirty trays in the distillation tower at a rate of 2500 kg/h. The pressure at the top of the distillation tower was maintained at 5.33 kPa (40 mmHg) and the temperature at the top of the distillation tower was maintained at 44° C. during the distilling operation. The linear velocity of the liquid in the pot was 0.2 m/s and its retention time in the pot was 11 minutes. The level (h) of the liquid was made equal to half the height (H) of a head surface at the bottom of the distillation tower (h=0.5H).

Hydroquinone was used as a polymerization inhibitor. It was added from the top of the distillation tower in such quantities that will achieve a concentration of 100 parts per million (ppm) in a vapor at the top of the distillation tower. Also, a specific amount of oxygen-containing gas was fed into the distillation tower from its bottom.

The distilling operation was carried out continuously for a period of one month using the aforementioned arrangement, and stopped for inspection. The distillation tower was operated in a stable manner without any problem during the one-month period. After the one-month-long operation, the interior of the distillation tower and a strainer were inspected and practically no polymer was identified.

EXAMPLE 2

An acrylic acid was distilled using the distillation apparatus A having an inner diameter of 1200 mm and provided with a pot measuring 300 mm in inner diameter as well as a bottom outflow pipe measuring 250 mm in inner diameter. In this distillation apparatus, S1/S2=0.063 and S1/S3=1.44.

A liquid having the same composition as that of Example 1 above was supplied to-the distillation apparatus and the distilling operation was carried out under the same distilling conditions as Example 1.

The distilling operation could be carried out for 33 successive days using this arrangement without developing any problem, and stopped for inspection.

Comparative Example 1

An acrylic acid was distilled using a distillation tower which is not provided with any pot. The distillation tower had an inner diameter of 800 mm and its bottom outflow pipe measured 100 mm in inner diameter.

A liquid containing 85 weight percent of the acrylic acid and 14 weight percent of an acetic acid was fed into the distillation tower from about the middle of 25-stage trays provided in the distillation tower at a rate of 1100 kg/h. The pressure at the top of the distillation tower was maintained at 5.33 kPa (40 mmHg) and the temperature at the top of the distillation tower was maintained at 44° C. during the distilling operation. The level (h) of the liquid was made equal to half the height (H) of a head surface at the bottom of the distillation tower (h=1.5H).

Hydroquinone was used as a polymerization inhibitor. It was added from the top of the distillation tower in such quantities that will achieve a concentration of 100 ppm in a vapor at the top of the distillation tower. Also, a specific amount of oxygen-containing gas was fed into the distillation tower from its bottom.

The distilling operation was carried out using the aforementioned arrangement, and it became impossible to operate the distillation tower on the 16th day of continuous operation. A later inspection revealed that the distillation tower failed due to formation of large quantities of a polymer on the trays and the head surface at the bottom of the distillation tower, for instance. The polymer was also found at a strainer in considerable quantities.

Comparative Example 2

An acrylic acid was distilled using a distillation tower having a pot at the bottom of the distillation tower, in which the value S1/S2 was greater than 0.5.

The distillation tower had an inner diameter of 1200 mm. The pot measured 900 mm in inner diameter and 500 mm in height while a bottom outflow pipe connected to the pot measured 300 mm in inner diameter. In this distillation tower, S1/S2=0.563 and S1/S3=9.000.

A liquid having the same composition as that of Example 1 above was supplied to the distillation tower and the distilling operation was carried out under the same distilling conditions as Example 1.

With this arrangement, it became impossible to operate the distillation tower on the 13th day of continuous operation.

Comparative Example 3

An acrylic acid was distilled using a distillation tower having a pot at the bottom of the distillation tower, in which the value S1/S3 was greater than 20.

The distillation tower had an inner diameter of 1200 mm. The pot measured 500 mm in inner diameter and 500 mm in height while a bottom outflow pipe connected to the pot measured 100 mm in inner diameter. In this distillation tower, S1/S2=0.174 and S1/S3=25.000.

A liquid having the same composition as that of Example 1 above was supplied to the distillation tower and the distilling operation was carried out under the same distilling conditions as Example 1. With this arrangement, it became impossible to operate the distillation tower on the 14th day of continuous operation.

Table 1 shows experimental data obtained with the aforementioned Examples 1 and 2 and Comparative Examples 1, 2 and 3.

TABLE 1

|  | Example 1 | Example 2 | Comparative Example 1 | Comparative Example 2 | Comparative Example 3 |
|---|---|---|---|---|---|
| Inner diameter of distillation tower (mm) | 1200 | 1200 | 800 | 1200 | 1200 |
| Inner diameter of pot (mm) | 500 | 300 | 100 | 900 | 500 |
| Height of pot (mm) | 500 |  |  | 500 | 500 |
| Inner diameter of bottom outflow pipe (mm) | 300 | 250 | 100 | 300 | 100 |
| S1/S2 | 0.174 | 0.063 | 0.016 | 0.563 | 0.174 |
| S1/S3 | 2.778 | 1.44 | 1.000 | 9.000 | 25.000 |
| Linear velocity in pot (mm/s) | 0.2 |  |  |  |  |
| Retention time (min.) | 11 |  |  |  |  |
| Operation time | Stopped for inspection after one month | Stopped for inspection after 33 days | Impossible to operate after 16 days | Impossible to operate after 13 days | Impossible to operate after 14 days |

As can be seen from Table 1, it became impossible to operate the distillation tower after about half a month or less of continuous operation in Comparative Example 1, in which the value S1/S2 did not fall within the range from 0.02 to 0.5 and the value S1/S3 did not fall within the range from more than 1 to 20, in Comparative Example 2, in which the value S1/S2 did not fall within the range from 0.02 to 0.5, and in Comparative Example 3, in which the value S1/S3 did not fall within the range from more than 1 to 20. In contrast, the distillation apparatus of Examples 1 and 2, in which the values S1/S2 and S1/S3 fell within the aforementioned ranges, could be operated continuously for a period of one month or more.

This application is based on patent application No. 11-308010 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A distillation apparatus comprising:
   a distillation tower having a cross-sectional area S2;
   a re-boiler;
   a recirculating pipe having a cross-sectional area S5 for flowing a portion of a liquid from said distillation tower to said re-boiler;
   a discharge pipe having a cross-sectional area S4 for discharging a remaining portion of the liquid from the distillation apparatus;
   a first pot having a cross-sectional area S1(A) positioned between a bottom of said distillation tower and said discharge pipe; and
   a second pot having a cross-sectional area S1(B) positioned between the bottom of said distillation tower and said recirculating pipe,
   wherein the following conditions are met
   (i) $0.02 \leq [S1(A)+S1(B)]/S2 \leq 0.50$
   (ii) $1 < S1(A)/S4 \leq 20$
   (iii) $1 < S1(B)/S5 \leq 20$.

2. The distillation apparatus according to claim 1, wherein said distillation tower, re-boiler, recirculating pipe, discharge pipe, first pot and second pot are constructed and arranged to distill an easily polymerizable compound.

3. The distillation apparatus according to claim 2, wherein the easily polymerizable compound includes a (meth)acrylic acid and/or its ester.

4. A distillation apparatus comprising:
   a distillation tower having a cross-sectional area S2;
   a re-boiler;
   a bottom outflow pipe having a cross-sectional area S3 for flowing a portion of a liquid from said distillation tower to said re-boiler and for discharging a remaining portion of the liquid from the distillation apparatus; and
   a pot having a cross-sectional area S1 positioned between a bottom of said distillation tower and said bottom outflow pipe such that said bottom outflow pipe is connected to a bottommost portion of said pot and an upper end of said pot is on a bottom of said distillation tower,
   wherein the following conditions are met
   (i) $0.02 \leq S1/S2 \leq 0.50$
   (ii) $1 < S1/S3 \leq 20$.

5. The distillation apparatus according to claim 4, wherein said distillation tower, re-boiler, bottom outflow pipe and pot are constructed and arranged to distill an easily polymerizable compound.

6. The distillation apparatus according to claim 5, wherein the easily polymerizable compound includes a (meth)acrylic acid and/or its ester.

7. A distillation apparatus comprising:
   a distillation tower having a cross-sectional area S2;
   a re-boiler;
   a recirculating pipe having a cross-sectional area S5 for flowing a portion of a liquid from said distillation tower to said re-boiler;
   a discharge pipe having a cross-sectional area S4 for discharging a remaining portion of the liquid from the distillation apparatus; and
   a pot having a cross-sectional area S1 positioned between a bottom of said distillation tower and said recirculating pipe and discharge pipe such that said recirculating pipe is connected to a bottommost portion of said pot and an upper end of said pot is on a bottom of said distillation tower,
   wherein the following conditions are met
   (i) $0.02 \leq S1/S2 \leq 0.50$
   (ii) $1 < S1/S4 \leq 20$
   (iii) $1 < S1/S5 \leq 20$.

8. The distillation apparatus according to claim 7, wherein said distillation tower, re-boiler, recirculating pipe, discharge pipe and pot are constructed and arranged to distill an easily polymerizable compound.

9. The distillation apparatus according to claim 8, wherein the easily polymerizable compound includes a (meth)acrylic acid and/or its ester.

10. The distillation apparatus according to claim 7, wherein said pot is positioned between the bottom of said distillation tower and said recirculating pipe and discharge pipe such that said discharge pipe is connected to a side of said pot.

11. A method for distilling an easily polymerizable compound by utilizing a distillation apparatus including a distillation tower having a head portion at a bottom thereof, a bottom outflow member and a pot member positioned between said head portion and said bottom outflow member, wherein said head portion has an upper end and a lower end and said pot member has a cross-sectional area that is less than a cross-sectional area of said distillation tower, said method comprising:

maintaining a liquid comprising an easily polymerizable compound within said distillation tower at a level between said upper end and said lower end of said head portion such that the condition $0.2H \leq h 0.8H$ is met, wherein h corresponds to the level of said liquid and H corresponds to a distance between said upper end of said head portion and said lower end of said head portion;

flowing said liquid from said distillation tower into said pot member;

flowing said liquid through said pot member at a linear velocity within the range of from 0.03 m/s to 1.00 m/s; and then     flowing said liquid from said pot member into said bottom outflow member.

12. A method for distilling an easily polymerizable compound by utilizing a distillation apparatus including a distillation tower having a head portion at a bottom thereof, a bottom outflow member and a pot member positioned between said head portion and said bottom outflow member, wherein said pot member has a cross-sectional area that is less than a cross-sectional area of said distillation tower, said method comprising:

maintaining a liquid comprising an easily polymerizable compound within said distillation tower at a level between upper and lower ends of said head portion, while         (i) flowing said liquid from said distillation tower into said pot member, and         (ii) flowing said liquid through said pot member into said bottom outflow member,     wherein flowing said liquid through said pot member comprises flowing said liquid through said pot member at a linear velocity within the range of from 0.03 m/s to 1.00 m/s.

13. A method for distilling an easily polymerizable compound by utilizing a distillation apparatus including a distillation tower, a bottom outflow member and a pot member positioned between a bottom of said distillation tower and said bottom outflow member such that said bottom outflow member is connected to a bottommost portion of said pot member and an upper end of said pot member is on said bottom of said distillation tower, wherein said pot member has a cross-sectional area that is less than a cross-sectional area of the distillation tower, said method comprising:

flowing a liquid comprising an easily polymerizable compound from said bottom of said distillation tower into said pot member; and     flowing said liquid through said pot member and from said bottommost portion of said pot member into said bottom outflow member,     wherein said distillation apparatus further includes a re-boiler, said distillation tower has a cross-sectional area S2, said bottom outflow member comprises an outflow pipe having a cross-sectional area S3, and said pot member comprises a pot having a cross-sectional area S1 positioned between said bottom of said distillation tower and said outflow pipe, such that the following conditions are met         (i) $0.02 \leq S1/S2 \leq 0.50$         (ii) $1 < S1/S3 \leq 20$,     wherein the flowing of the liquid comprising the easily polymerizable compound from said bottom of said distillation tower into said pot member comprises flowing said liquid from said bottom of said distillation tower into said pot, and the flowing of said liquid through said pot member and from said bottommost portion of said pot member into said bottom outflow member comprises flowing said liquid through said pot and from a bottommost portion of said pot into said outflow pipe, and     further comprising flowing some of said liquid through said outflow pipe into said re-boiler, and flowing some of said liquid through said outflow pipe from said distillation apparatus.

14. A method for distilling an easily polymerizable compound by utilizing a distillation apparatus including a distillation tower, a bottom outflow member and a pot member positioned between a bottom of said distillation tower and said bottom outflow member such that said bottom outflow member is connected to a bottommost portion of said pot member and an upper end of said pot member is on said bottom of said distillation tower, wherein said pot member has a cross-sectional area that is less than a cross-sectional area of the distillation tower, said method comprising:

flowing a liquid comprising an easily polymerizable compound from said bottom of said distillation tower into said pot member; and     flowing said liquid through said pot member and from said bottommost portion of said pot member into said bottom outflow member,     wherein said distillation apparatus further includes a re-boiler, said distillation tower has a cross-sectional area S2, said bottom outflow member includes a recirculating pipe having a cross-sectional area S5 and a discharge pipe having a cross-sectional area S4, and said pot member includes a first pot having a cross-sectional area S1(A) positioned between said bottom of said distillation tower and said discharge pipe and also includes a second pot having a cross-sectional area S1(B) positioned between said bottom of said distillation tower and said recirculating pipe, such that the following conditions are met         (i) $0.02 \leq [S1(A)+S1(B)]/S2 \leq 0.50$         (ii) $1 < S1(A)/S4 \leq 20$         (iii) $1 < S1(B)/S5 \leq 20$,     wherein the flowing of the liquid comprising the easily polymerizable compound from said bottom of said distillation tower into said pot member comprises flowing said liquid from said bottom of said distillation tower into each of said first and second pots, and the flowing of said liquid through said pot member and from said bottommost portion of said pot member into said bottom outflow member comprises flowing a first portion of said liquid through said first pot and from a bottommost portion of said first pot into said discharge pipe and also comprises flowing a second portion of said liquid through said second pot and from a bottommost portion of said second pot into said recirculating pipe, and further comprising flowing said second portion of said liquid through said recirculating pipe into said re-boiler, and flowing said first portion of said liquid from said distillation apparatus through said discharge pipe.

15. A method for distilling an easily polymerizable compound by utilizing a distillation apparatus including a distillation tower, a bottom outflow member and a pot member positioned between a bottom of said distillation tower and said bottom outflow member such that said bottom outflow member is connected to a bottommost portion of said pot member and an upper end of said pot member is on said bottom of said distillation tower, wherein said pot member has a cross-sectional area that is less than a cross-sectional area of the distillation tower, said method comprising:

flowing a liquid comprising an easily polymerizable compound from said bottom of said distillation tower into said pot member; and flowing said liquid through said pot member and from said bottommost portion of said pot member into said bottom outflow member, wherein said distillation apparatus further includes a re-boiler, said distillation tower has a cross-sectional area $S2$, said bottom outflow member includes a recirculating pipe having a cross-sectional area $S5$ and a discharge pipe having a cross-sectional area $S4$, and said pot member comprises a pot having a cross-sectional area $S1$ positioned between said bottom of said distillation tower and said discharge pipe and recirculating pipe, such that the following conditions are met (i) $0.02 \leq S1/S2 \leq 0.50$
(ii) $1 < S1/S4 \leq 20$
(iii) $1 < S1/S5 \leq 20$, wherein the flowing of the liquid comprising the easily polymerizable compound from said distillation tower into said pot member comprises flowing said liquid from said bottom of said distillation tower into said pot, and the flowing of said liquid through said pot member and from said bottommost portion of said pot member into said bottom outflow member comprises flowing a first portion of said liquid through said pot and from a bottommost portion of said pot into said recirculating pipe, and further comprising flowing said first portion of said liquid through said recirculating pipe into said re-boiler, and flowing a second portion of said liquid from said pot into said discharge pipe and from said distillation apparatus through said discharge pipe.

16. The method according to claim 15, wherein said discharge pipe is connected to a side of said pot, and flowing the second portion of said liquid from said pot into said discharge pipe comprises flowing the second portion of said liquid from said pot into said discharge pipe.

17. A method for distilling an easily polymerizable compound by utilizing a distillation apparatus including a distillation tower having a head portion at a bottom thereof, a bottom outflow member and a pot member positioned between said head portion and said bottom outflow member such that said bottom outflow member is connected to a bottommost portion of said pot member and an upper end of said pot member is on a lower end of said head portion, wherein said pot member has a cross-sectional area that is less than a cross-sectional area of the distillation tower, said method comprising:

maintaining a liquid comprising an easily polymerizable compound within said distillation tower at a level between said lower end of said head portion and an upper end of said head portion;

flowing said liquid from said bottom of said distillation tower into said pot member; and flowing said liquid through said pot member and from said bottommost portion of said pot member into said bottom outflow member, wherein the flowing of said liquid through said pot member comprises flowing said liquid through said pot member at a linear velocity within the range of from 0.03 m/s to 1.00 m/s.

* * * * *